INVENTOR.
FRIEDRICH L. U. DOBLHOFF

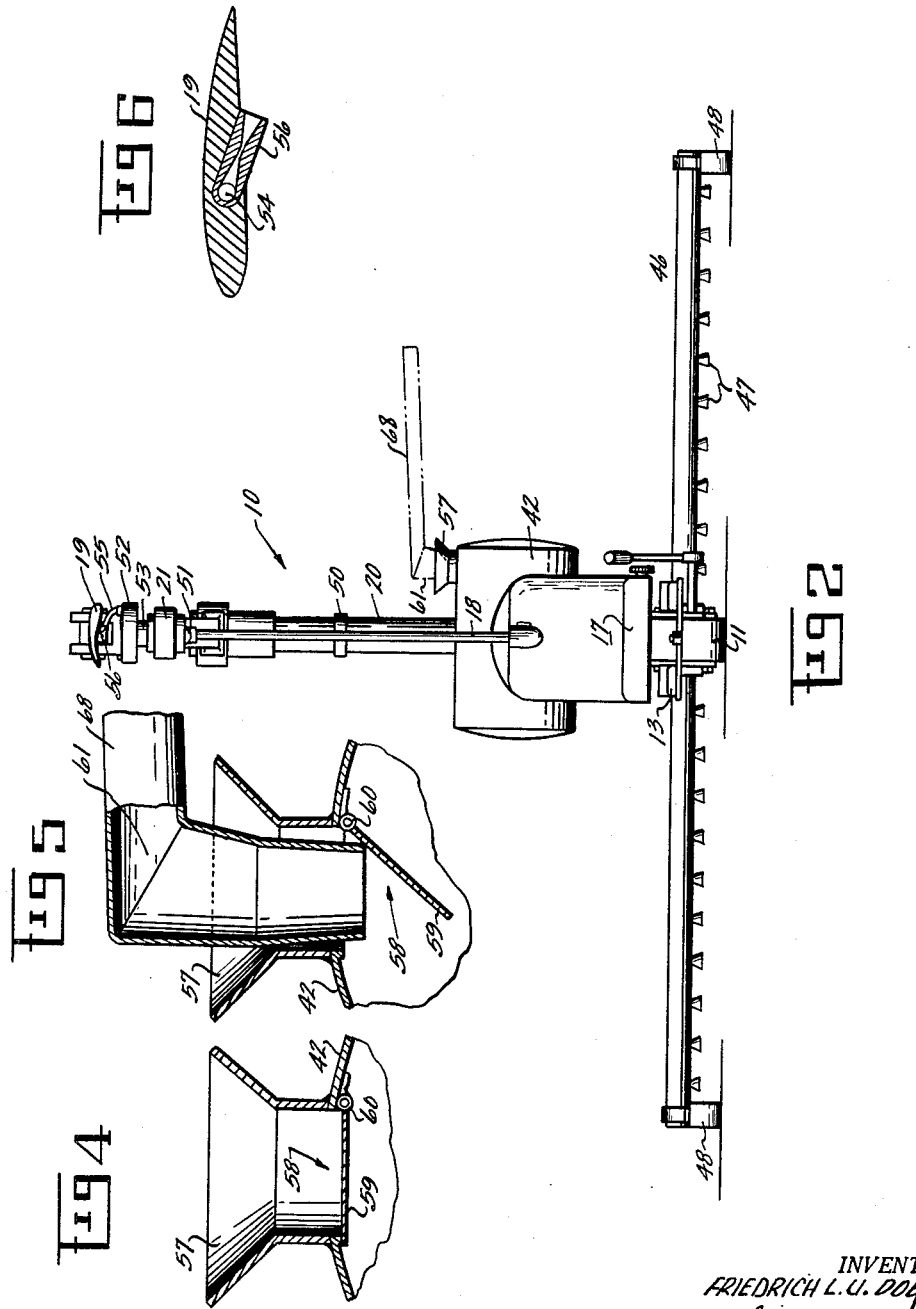

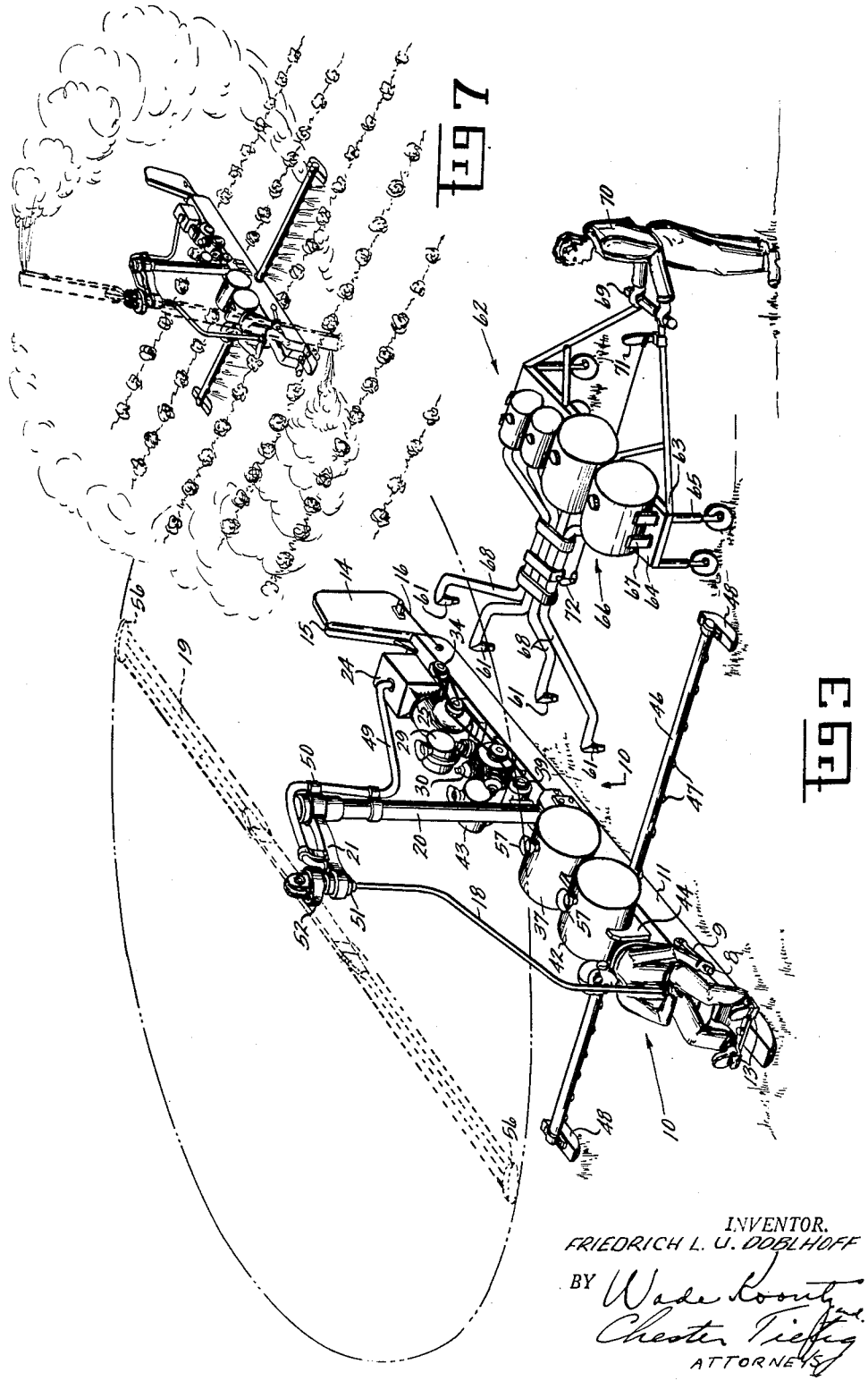

Patented Nov. 17, 1953

2,659,556

UNITED STATES PATENT OFFICE 2,659,556

METHOD OF DISTRIBUTING INSECTICIDES OR FUNGICIDES AND STEAM JET-DRIVEN HELICOPTER FOR PERFORMING SAME

Friedrich L. U. Doblhoff, St. Louis, Mo.

Application August 16, 1950, Serial No. 179,842

7 Claims. (Cl. 244—136)

(Granted under Title 35, U. S. Code (1952), sec. 266)

The invention described herein may be manufactured and used by or for the Government for governmental purposes without payment to me of any royalty thereon.

The advantages of the distribution of insecticides and fungicides from aircraft, even from helicopters, are well known. It was not known however, previous to this invention that a steam jet-driven helicopter provides an ideal means for the distribution of insecticides. The reason for the advantage is that the steam exhaust of the helicopter, by humidifying the surrounding air and increasing the downwash or slipstream turbulence increases the adhesion of the dust and improves the distribution of liquid sprays on crops.

The increased humidity in the immediate vicinity of the helicopter moistens the leaves, fruits and other infested objects, thereby preventing the simultaneously applied insecticide dust from falling to the ground, or from drifting away, or from remaining inactive due to insufficient contact with the surface of the infested object. Further, the turbulence resulting from the high velocity of expanding steam further improves the adhesion and even distribution of the dust. In the case of distribution in the form of liquid sprays, the increased turbulence assists the breaking-up of the liquid into atomized droplets and even spreading of the droplets on the leaves through the moisture resulting from the condensation of the steam. It prevents the condition which tends to exist with conventional spray aircraft when highly concentrated water solutions are employed, to evaporate the water or other carrier fluid from the dissolved material before the spray reaches the ground. The prevalence of water vapor in the spray, due to the steam exhaust, reduces this difficulty and permits the use of higher concentration and finer droplets.

One object therefore of the present invention is to provide a method of distributing fungicides and insecticides with steam not necessarily originally from a steam-driven helicopter, although such aircraft is the preferred source.

Another object is to provide a general method of treating plant life with insecticides or the like from helicopters in which a blanket of condensed steam is provided ahead of the air path of the helicopter to moisten the plant life first and then apply the insecticide etc., from the same helicopter whereby the then distributed chemical will adhere to the plant life to a greater extent than if no preliminary moistening had been performed;

Another object of the present invention is to provide a steam jet-driven helicopter, especially adapted to the work of distributing fungicides and insecticides and which is especially adapted to operate at very low altitudes;

Another object of the invention is to provide a steam jet-driven helicopter, the initial and maintenance costs of which are much lower than those incurred in the case of mechanical helicopters and which permits the use of kerosene, fuel oil and the like in place of the more expensive gasoline;

Another object is to provide a propulsion system for the helicopter in which the use of a high-pressure boiler is avoided and for which is substituted a light water tank operating at atmospheric pressure or slightly above;

Another object is to provide a steam driven helicopter of increased maneuverability due to the steam exhaust and the blade downwash or slipstream being directed past the rudder; and Another object is to provide a helicopter structure which is adapted to be filled simultaneously in all of its various tanks and containers in the shortest possible time. This is accomplished by a piece of ground equipment having tanks or containers for all fluids and chemicals required for the operation of the vehicle. These are similar in volume and linear order to the tanks and containers carried by the helicopter. To these ground tanks are attached hoses of sufficient diameter to permit rapid flow of the fluids and chemicals. The dispensary ends of the hoses are arranged in a battery to conform with the various filler necks on the helicopter tanks. The entire ground rig is mounted on wheels or skids. While the helicopter is in flight, the tanks on the ground rig are filled with the required fluids and chemicals and as soon as the helicopter has landed the ground rig is wheeled into position and its battery of dispensing nozzles is inserted simultaneously in all filter necks of the helicopter.

The transfer of fluids of the chemical from the ground rig to the helicopter may be performed rapidly, opening all valves in the hoses simultaneously and allowing gravity or other suitable means such as pump for fluids or agitators for dry chemicals to perform the transfer.

Referring now to the drawings:

Fig. 2 is an end view taken from the front end pilot's seat;

Fig. 3 is an oblique perspective view showing the helicopter on the ground, together with a ground rig from which the tanks are about to be refilled;

Fig. 4 is a vertical section of a tank neck;

Fig. 5 is a vertical section similar to Fig. 4 with the addition of the cooperating partially sectioned filling spout of the ground rig. Operation of the automatic valve is shown;

Fig. 6 is a section of a rotor blade tip showing the steam conduit and downwardly slanted steam exit pipe; and Fig. 7 is a prospective view of a helicopter in flight performing the steps of advance steam distribution and scattering of insecticide simultaneously.

Figure 1:
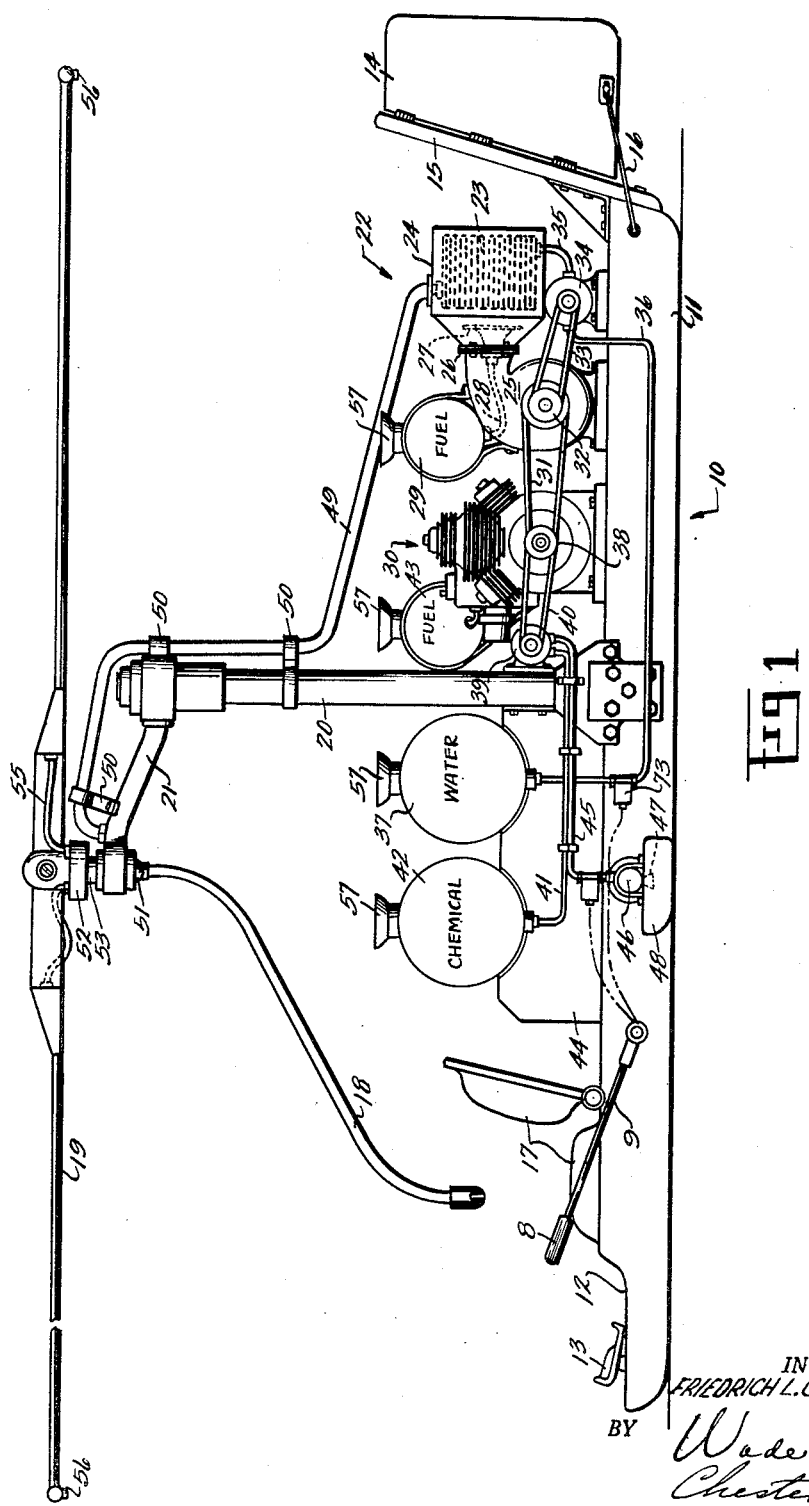
Fig. 1 is a side elevation of my helicopter.

In Fig. 1, 10 is a helicopter having a central ground engaging runner 11, the front end 12 of which is slightly cut down to accommodate the positioning of a pair of rudder pedals 13 which control a rear rudder 14 mounted on a post 15 through a pair of cables one of which is 16. A pilot's seat 17 is mounted on the runner 11 from which a control lever 18 is adapted to control the direction of a multiblade rotor 19. The rotor 19 is mounted on a mast 20 through a heavy arm 21 which serves to carry the rotor 19 in an offset position.

A steam power plant 22 is mounted on the central runner 11 between the rudder post 15 and the mast 20. It comprises a boiler 23 which may be either of the flash type or perforated drum fire tube type. A fire box 24 encloses the boiler, which is not however confined at the rear. A blower 25 is connected to the fire box 24 through a gasket joint 26. The latter serves to support a fuel atomizer 27 which is fed by a fuel line 28 from a fuel tank 29.

The blower 25 is driven from a small internal combustion engine 30, likewise mounted on the runner 11, preferably through a V belt 31 to a double pulley 32 which provides a speed reduction. A second V belt 33 drives a water pump 34 which supplies boiler 23 via pipes 35 and 36, the latter leading from a water tank 37 ahead of the mast 20. A second double pulley 38 on the engine 30 also drives a chemical pump 39 through a V belt 40. The pump 39 may be a conventional one for liquids, such as a centrifugal or geared pump or it may be a device for moving powders, such as known to the art. Some of these employ spirals or helices. The pump 39 is supplied by a pipe 41 from a tank 42 designated "chemical" which indicates that a wide variety of reagents may be employed and that these may be liquids, solids (i. e. powders) or solutions. A separate fuel tank 43 may be mounted on the engine 30 or the engine may use fuel from tank 29 if desired. Tanks 37 and 42 are mounted upon a center board or rack 44 to which pipes 36, 41 and a chemical delivery pipe 45 from pump 39 may be conveniently attached. The pipe 45 leads to the approximate middle of a sprayboom 46, the underside of which is provided with a plurality of regularly spaced nozzles 47. At each end of the spray boom 46 there is a skid 48 which serves as an outrigger to keep the craft upright on the ground (see Fig. 3).

Steam delivery from the boiler 23 is provided for by a flexible pipe 49 which is attached to the mast 20 and arm 21 by clamps 50. At the end of the arm 21 there is a universal joint 51 upon which the rotor 19 is mounted and through which its inclination may be controlled by the lever 18. Such action, as is well known, enables the craft to be steered. Above the universal 51 a combination steam manifold and rotating cap 52 encircles the rotor stem 53 admitting steam to the pipes 54 in the rotor 19 (see Fig. 6) via the small flexible tubes 55 between the manifold 52 and the rotor pipes 54. The manifold 52 obtains its steam through the rotor stem 53 which is in turn supplied with steam through the universal joint 51 and the outer end of the arm 21. Connection of the pipe 50 to the outer end of this arm is shown. The universal 51 does not rotate with the rotor 19, but the combination can and manifold 52 does. A collective-control lever 9 is also provided for the control of a water throttle 73 through turning the grip 8. The lever also serves to regulate the collective pitch of the blades of the rotor 19 through a conventional swash plate (not shown) or other conventional means. The axis of rotation lies along the pipes 54.

It may be observed from Fig. 6 that the pipe 54 terminates in a jet or nozzle 56 which is set on the blades 19 so that it has both a rearward and a downward directional component. Not only a propulsive effect is thereby realized, but a pronounced downwash of mixed air and condensed steam about the entire helicopter. This downwash or slipstream also flows past the rudder 14 which is in its path and which is also in the path of combustion products blown out from the firebox 23. Rudder 14 therefore is amply provided with a gas stream against which to react, so that a comparatively small rudder will serve to provide ample steering. The downwash or slipstream also has a beneficial effect on the chemical spray as before explained.

Referring now to Fig. 1, the various tanks 42, 37, 43 and 29 are each provided with a flared filler pipe 57 which, as shown in Figs. 4 and 5 is provided with an internal valve 58 comprising a trapdoor 59 spring hinged at 60. Each filler pipe is brought to a uniform height, as shown in Fig. 1. Such arrangement makes filling from a multispout filling means 61 (Figs. 2, 3 and 5) easier, since only one height adjustment need be made for all spouts. Each spout 61 pushes the valve means 58 down at the same time and the trapdoors 59 are returned to closed position at the same time due to the spring hinge 60.

Referring now solely to Fig. 3, there is illustrated a combination of a ground rig 62 and my special helicopter 10. The ground rig and helicopter form a true combination since each is adapted to the other and both cooperate to produce a unitary result, i. e., rapid, expeditious, efficient spraying. Both are single-purpose machines.

The ground rig 62 comprises a frame 63 forming a platform 64 supported by preferably four wheeled legs 65. On the platform 64 a set of tanks 66, corresponding in size, number, contents, order and position to the helicopter tanks, are mounted by means of a rack 67 to uniform height. The multiple spout 61, which is composed of as many delivery pipes as there are tanks, has one pipe 68 connected into each tank. The pipes 68 are banded together intermediate of their ends, but separated at the delivery ends so that their spouts 61 will each register with its respective filler pipe 57 and be long enough to operate the valve means 58 therein. The frame 63 is provided with a long handle bar to enable the operator 79 to perform his duties in safety while the rotor 19 is turning.

After the helicopter 10 has landed for refilling, the operator pushes the ground rig as shown by the handle bar 69 under the revolving rotor, temporarily balances the rig on its rear wheels while he elevates the spouts 61 to clear the flared filler pipes and then lowers the front wheels to allow the spouts 61 to open the valve means 58. He then operates a lever and rod control 71 which operates a series of ganged quick-opening valves 72, one being located in each delivery pipe 68. When the helicopter tanks are full, he releases the lever 71, whereupon all valves 72 close simultaneously. He then elevates the front wheels again and while they are elevated withdraws the rig. During the filling operation, even if the operator is careless and allows the tanks to overflow he will not waste much liquid because the capacity of each tank on the rig is the same as its corresponding tank on the helicopter and it is assumed that the pilot will not land for a refill until his tanks are nearly empty. The capacity ratios of his tanks are chosen so that their contents will be exhausted substantially simultaneously; however a safety margin of extra capacity is provided in the tank holding the fuel for the steam plant.

While my method of treating plant life with insecticides or the like can be accomplished most expeditiously with the special steam-driven helicopter described, it can also be carried out with a conventional internal-combustion engine driven helicopter. This aircraft should carry a steam generating plant and appropriate chemical and water tanks and appropriate pipes for ejecting steam in the flight path in advance of the helicopter. Means for simultaneously spraying the chemicals in a direction nearer the vertical than that of the steam jet should also be provided and operated simultaneously with the steam ejection means and the advance of the aircraft. An elevation of from ten to fifty feet over the plant life to be treated is the preferred range of elevation for carrying out the method.

What I claim is:

1. A helicopter vehicle for the aerial distribution of chemicals comprising a water tank, a pump receiving water from said tank, a boiler receiving water from said pump, a burner for supplying heat to said boiler, a steam line attached to the outlet of said boiler, a plurality of helicopter blades rotatably mounted on said vehicle, each blade having one or more steam reaction nozzles mounted on said rotor blades receiving steam from said steam line for rotating the same and to discharge steam condensate or water vapor in a circular area below the blade during rotation thereof, a container for chemicals and means for the distribtuion of said chemicals in the aforesaid moisture laden area below said blades.

2. A helicopter for the aerial distribution of chemicals as set forth in claim 1 in which the said means for the distribution of said chemicals includes an auxiliary power means and pump means driven thereby for the distribution of said chemicals below the area covered by the helicopter blades.

3. In combination, a helicopter, a hollow-blade rotor therefor, a steam generating means thereon, means for delivering steam therefrom to the interior of said rotor, exhaust means for the steam at the tips of the rotor blades for exhausting the steam in a direction having a rearward component and a downward component, whereby to rotate the rotor and lift the helicopter, and means for spraying an insecticide or the like in the path of the downwash or slipstream of condensed steam which results from the aforesaid operation of the rotor.

4. In combination in a helicopter, a central runner, an operator's chair and controls substantially at the front end of said runner, a rudder mounted at the rear end of said runner, a mast substantially intermediate of said chair and rudder, a multiblade helicopter rotor operatively mounted on said mast and formed with a steam delivery conduit extending longitudinally therethrough, a steam generator mounted on the rear portion of said runner, including a fire box, steam conduit connections therefrom to said rotor steam delivery conduit, steam jet discharge means on the ends of said blades connected to rotor steam delivery conduit for discharging steam therefrom to rotate the blades of the rotor for lift and distribution of steam below the area covered by the blades during rotation thereof, a blower operatively mounted on said runner to deliver air to the fire box, a fuel supply including a tank mounted on said runner to deliver fuel to said fire box and to said air stream from said blower, an internal combustion engine mounted on said runner operatively connected to said blower, an insecticide delivery system mounted on said runner comprising a tank for insecticide, a pump for delivering insecticide therefrom, a spray boom arranged crosswise of said central runner in the area covered by said helicopter blades during rotation thereof, spray nozzles operatively arranged in a substantially uniform manner along the length of said spray boom for discharging insecticide therefrom and means for delivering insecticide from said last tank to said nozzles including the pump and a driving connection therefor from said internal combustion engine.

5. The combination recited in claim 4 in which the rudder is mounted in alignment with the blast of combustion products resulting from combustion within the fire box.

6. In a helicopter, a steam boiler, a fire box therefor, means for creating a blast of air through said fire box, and in a rearward direction, a multiple blade rotor, means for introducing steam into said rotor and blades; downwardly and rearwardly angled jet discharge means at the end portions of the blades for discharging a jet of steam downwardly and rearwardly substantially from each tip of said blades, for distributing the steam in a circular path below the area covered by the blades during rotation thereof, a rudder for steering said helicopter, said rudder being normally aligned with the downward component of the steam discharged from said blades during rotation of the rotor and the rearward direction of the blast of combustion products from the fire box, to promote maneuverability of the helicopter and effect turbulence in the steam distributed area, and means carried by the helicopter located in said circular area below the blades for introducing an insecticide, fungicide, or the like into the downwash or slipstream of water vapor from said steam discharge jets into said area.

7. The method of aerial distribution of insecticides and the like for treatment of material in an area below, which comprises discharging water vapor under pressure in a circular path in a downward direction over and toward the area to be treated from a position above the area to be treated and simultaneously injecting the insecticide into water vapor within said circular path, above the said area to be treated and below the point of discharge of the water vapor, whereby the downwardly directed water vapor moistens the treated area, acts as a conveying medium carrying the insecticide downwardly and distributing the same for deposit over the area to be treated and moistens said area to be treated to assist in retaining the insecticide in contact with said material in treated area.

FRIEDRICH L. U. DOBLHOFF.

References Cited in the file of this patent

UNITED STATES PATENTS

| Number | Name | Date |
|---|---|---|
| 1,344,661 | Strong | June 29, 1920 |
| 1,514,359 | York | Nov. 4, 1924 |
| 1,740,032 | Pecard | Dec. 17, 1929 |
| 2,001,529 | Dornier | May 14, 1935 |
| 2,098,887 | Satterlee | Nov. 9, 1937 |
| 2,433,251 | Whiting | Dec. 23, 1947 |
| 2,504,580 | Pierson | Apr. 18, 1950 |
| 2,583,883 | Ripper | Jan. 29, 1952 |
| 2,583,884 | Ripper et al. | Jan. 29, 1952 |
| 2,590,457 | Pouit | Mar. 25, 1952 |